United States Patent [19]

Fujimoto

[11] Patent Number: 5,048,487
[45] Date of Patent: Sep. 17, 1991

[54] IGNITION TIMING CONTROL SYSTEM FOR INTERNAL COMBUSTION ENGINE

[75] Inventor: Sachito Fujimoto, Wako, Japan

[73] Assignee: Honda Giken Kogyo Kabushiki Kaisha, Tokyo, Japan

[21] Appl. No.: 580,458

[22] Filed: Sep. 11, 1990

[30] Foreign Application Priority Data

Sep. 12, 1989 [JP] Japan .................. 1-107080[U]

[51] Int. Cl.⁵ .................................. F02P 5/00
[52] U.S. Cl. ...................... 123/418; 123/609
[58] Field of Search ............... 123/609, 610, 416, 418

[56] References Cited

U.S. PATENT DOCUMENTS 4,440,141 4/1984 Tsujimura et al. .................. 123/609
4,516,554 5/1985 Miura et al. ........................ 123/418
4,558,684 12/1985 Caddy et al. ....................... 123/609
4,933,861 6/1990 Allen et al. ......................... 123/609

Primary Examiner—Tony M. Argenbright
Assistant Examiner—Robert E. Mates
Attorney, Agent, or Firm—Armstrong, Nikaido, Marmelstein, Kubovcik & Murray

[57] ABSTRACT

A system for controlling ignition timing of an internal-combustion engine which is capable of securing adequate ignition energy in all engine operation regions including acceleration or high speed engine operation. The retard limit for ignition timing is determined with respect to engine speed. A ratio of dwell angle on an ignition coil to a prescribed angle is calculated and compared with reference value. When the ratio is found to exceed the reference value, the retard limit is changed in advance direction so that ignition timing is caused to be advanced. Misfirings are thus avoided.

5 Claims, 6 Drawing Sheets

IGNITION TIMING CONTROL SYSTEM FOR INTERNAL COMBUSTION ENGINE

BACKGROUND OF THE INVENTION

1. Field of the Invention

This invention relates to an ignition timing control system for internal combustion engines, and more particularly to an ignition timing control system for internal combustion engines which is capable of conducting ignition timing retard control so as to enable securement of adequate ignition energy in all engine operation regions and specifically to enable securement of adequate ignition energy for eliminating any danger of misfirings during times of engine speed change such as during acceleration and during high speed engine operation.

2. Description of the Prior Art

Recent years have seen the proposal of a number of internal combustion engine ignition timing control systems which include ar ignition timing retard adjustment that is activated during acceleration or the like for retarding the ignition timing in crank angle degrees so as to reduce engine output and thus suppress vehicle vibration. The assignee, for example, applied for patent on such a system under Japanese Patent Application No. 1(1990)-45373 filed on Apr. 18, 1989.

The limit value of the ignition timing on the retarded side is determined by the relationship between the required voltage (the voltage necessary for breakdown of the insulation (air gap) between the electrodes of the spark plug) and the generated voltage (the voltage generated by the ignition coil). Specifically, as shown in FIG. 7, the limit $\theta_{igLGG}$ on the ignition timing retard side centers on a battery voltage of 14.3 V and is set to increase in proportion as the engine speed increases. Therefore, if the ignition timing should be retarded when the engine speed is high or when the battery voltage is low, it may be impossible to provide the required voltage, which may, in the worst case, result in misfirings.

More specifically, where the TDC (top dead center) interval is represented by T as indicated in FIG. 8 and the dwell angle of the ignition coil, that is the time during which the current control transistor of the primary coil is on, is represented by t, the ON duty ratio (hereinafter sometimes called simply the "duty ratio") can be represented by t/T. So as to secure the energy required for ignition when the battery voltage $V_B$ decreases, the ordinary practice is to establish a compensation coefficient K as shown in FIG. 9 and to increase the conductive period of the transistor to that obtained by multiplying the duty ratio (t/T) by the coefficient. As shown in FIG. 10, when the decrease in battery voltage becomes large, the duty ratio also becomes large, with the result that the amount by which the ignition timing is retarded increases, increasing the likelihood of misfirings. More specifically, as will be understood from FIG. 10, the shortening of the ignition period (TDC interval) with increasing engine speed makes it difficult to secure the required conductive period, while, as can be seen in FIG. 11, the required voltage grows greater with respect to the generated voltage with increasing proximity of the crank angle to TDC. This is because it is a general rule that the insulation breakdown voltage increases with increasing compression ratio in the combustion chamber, and since retarding the ignition timing is tantamount to shifting the ignition timing toward the compression point, this means that the required voltage becomes higher. Therefore, if retard adjustment, which tends to increase the required voltage, should be carried out when the decrease in battery voltage becomes large or the engine speed becomes high, there may in some cases occur misfirings. Since at this time the aforesaid retard control is implemented in view of factors on the power transmission side, if conducted during high engine speed operation, as during acceleration or the like, it may make it impossible for the generated voltage to satisfy the required voltage and, as a result, may in some cases lead to misfirings.

SUMMARY OF THE INVENTION

In view of the foregoing, one object of the present invention is to provide an ignition timing control system for internal combustion engines for overcoming the aforesaid problems of the conventional systems.

Another object of the invention is to provide such a system which is capable of conducting ignition timing retard control so as to enable securement of adequate ignition energy in all engine operation regions and specifically to enable securement of adequate ignition energy for eliminating any danger of misfirings during high engine speed operation and the like.

This invention achieves these objects by providing a system for controlling an ignition timing of an internal combustion engine, comprising first means for detecting operating condition of the engine, second means for determining dwell angle of an ignition coil on the basis of the detected engine operating condition, third means for determining a retard limit on the basis of the detected engine operating condition such that ignition timing of the engine is determined within the retard limit, fourth means for calculating a ratio of the dwell angle to a prescribed angle and then for comparing the ratio with a reference value and fifth means for changing the retard limit in the advance direction when the ratio is found to exceed the reference value.

DETAILED DESCRIPTION OF THE INVENTION

The invention will now be explained with reference to a specific embodiment.

Figure 1:
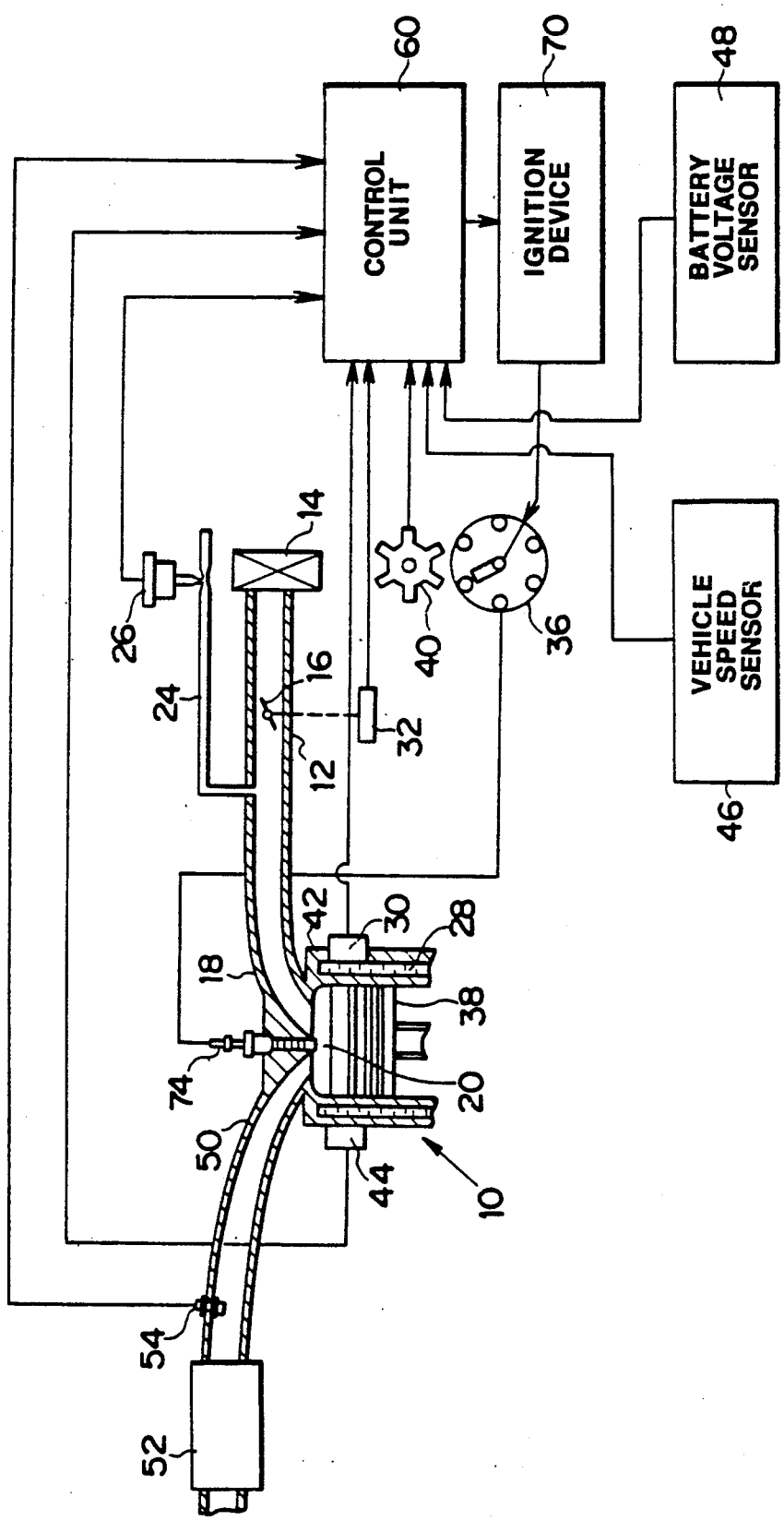
FIG. 1 is a schematic view of an ignition timing control system for an internal combustion engine in accordance with this invention.

FIG. 1 shows the overall arrangement of an ignition timing control system for internal combustion engines in accordance with this invention. A six-cylinder vehicle internal combustion engine 10 (shown partially in schematic representation) has an air intake passage 12 provided at its distal end with an air cleaner 14 and at an intermediate portion thereof with a throttle valve 16. Air drawn in through the air cleaner 14 has its flow rate controlled by the throttle valve 16 and passes through an intake manifold 18 to the combustion chambers 20 (only one shown) of the engine cylinders. A pipe 24 branches off from the air intake passage 12 at an appropriate position downstream of the throttle valve 16. The pipe 24 is provided near its far end with a manifold absolute pressure sensor 26 which detects the engine load by measuring the absolute value of the intake air pressure. A coolant temperature sensor 30 is provided i: the vicinity of a cooling water passage 28 of the internal combustion engine 10 for detecting the temperature of the engine cooling water and a manifold air temperature sensor (not shown) is provided at an appropriate position downstream of the throttle valve 16 for detecting the temperature of the air drawn into the engine. A throttle position sensor 32 is further provided at an appropriate position on the engine for detecting the degree of opening of the throttle valve 16.

The internal combustion engine 10 has a distributor 36 which includes a crankshaft sensor 40 comprised of a magnet which rotates in synchronism with a crankshaft (not shown) rotated by the reciprocal motion of pistons 38 and a stationary member disposed opposite the magnet. The crankshaft sensor 40 outputs a signal once every predetermined angle of crankshaft rotation. At an appropriate location on a cylinder block 42 of the internal combustion engine 10 is provided a piezoelectric detonation sensor 44 for detecting vibration produced by combustion knock arising within the combustion chambers 20, while at an appropriate portion of the vehicle there is provided a vehicle speed sensor 46 for detecting the speed at which the vehicle is traveling. The voltage of the battery (not shown) is further detected by an appropriately disposed battery voltage sensor 48. The exhaust passage 50 of the internal combustion engine 10 is provided with a three-way catalytic converter 52 for reducing the amount of pollutants in the exhaust gas before it is emitted into the atmosphere. Immediately upstream of the three-way catalytic converter 52 is provided an oxygen sensor 54 for detecting the oxygen concentration of the exhaust gas. The output of the manifold absolute pressure sensor 26 and the other sensors 30, 32, 40, 44, 46, 48 and 54 are forwarded to a control unit 60.

Figure 2:
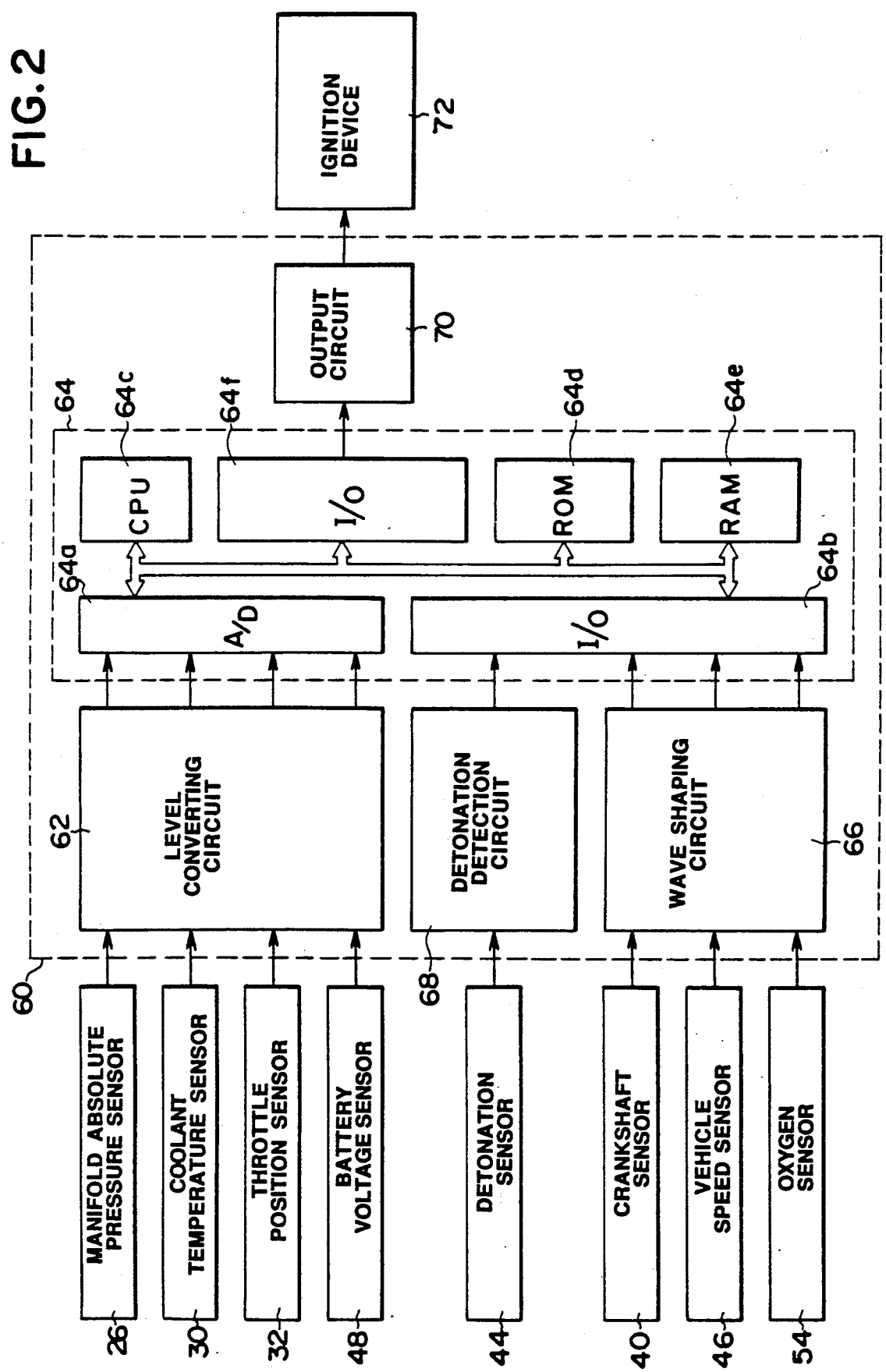
FIG. 2 is a block diagram showing details of the control unit of the system of FIG. 1.

The arrangement of the control unit 60 is illustrated in FIG. 2. The outputs from the manifold absolute pressure sensor 26 and the other sensors are input to a level converting circuit 62 in the control unit 60 for adjustment to a prescribed level and are then forwarded to a microcomputer 64. The microcomputer 64 comprises an A/D converter 64a, an I/O circuits 64b, 64f, a CPU (central processing unit) 64c, a ROM (read-only memory) 64d, a RAM (random access memory) 64e, a counter for computation and a timer (the two last mentioned members not being shown). The signals output by the level converting circuit 62 are converted to digital values by the A/D converter 64a in accordance with commands from the CPU 64c and are then temporarily stored in the RAM 64e. The digital outputs of the crankshaft sensor 40 etc. are shaped in a wave shaping circuit 66 and then input to the microcomputer 64 through the I/O circuit 64b. After being sent to the control unit 60, the output from the detonation sensor 44 is input to a detonation detection circuit 68 where it is discriminated whether or not knock has occurred and the result of the discrimination is input to the microcomputer 64 via the I/O circuit 64b.

As will ba explained in more detail later, the microcomputer 64 calculates the engine speed from the output of the crankshaft sensor 40, judges the engine load state from the output of the manifold absolute pressure sensor 26, retrieves a basic ignition timing map from the ROM 64d and uses the same for calculating a basic ignition timing, adjusts the bas-c ignition timing on the basis of the intake air temperature and other parameters, further adjusts the so-obtained ignition timing if engine knock has occurred thereby obtaining the final ignition timing and issues an ignition command via the I/O circuit 64f and an output circuit 70 to an igniter or other such ignition device 72, thereby causing a spark plug 74 of a prescribed cylinder selected by the distributor 36 to fire and ignite the air-fuel mixture in the associated combustion chamber 20.

Figure 3:
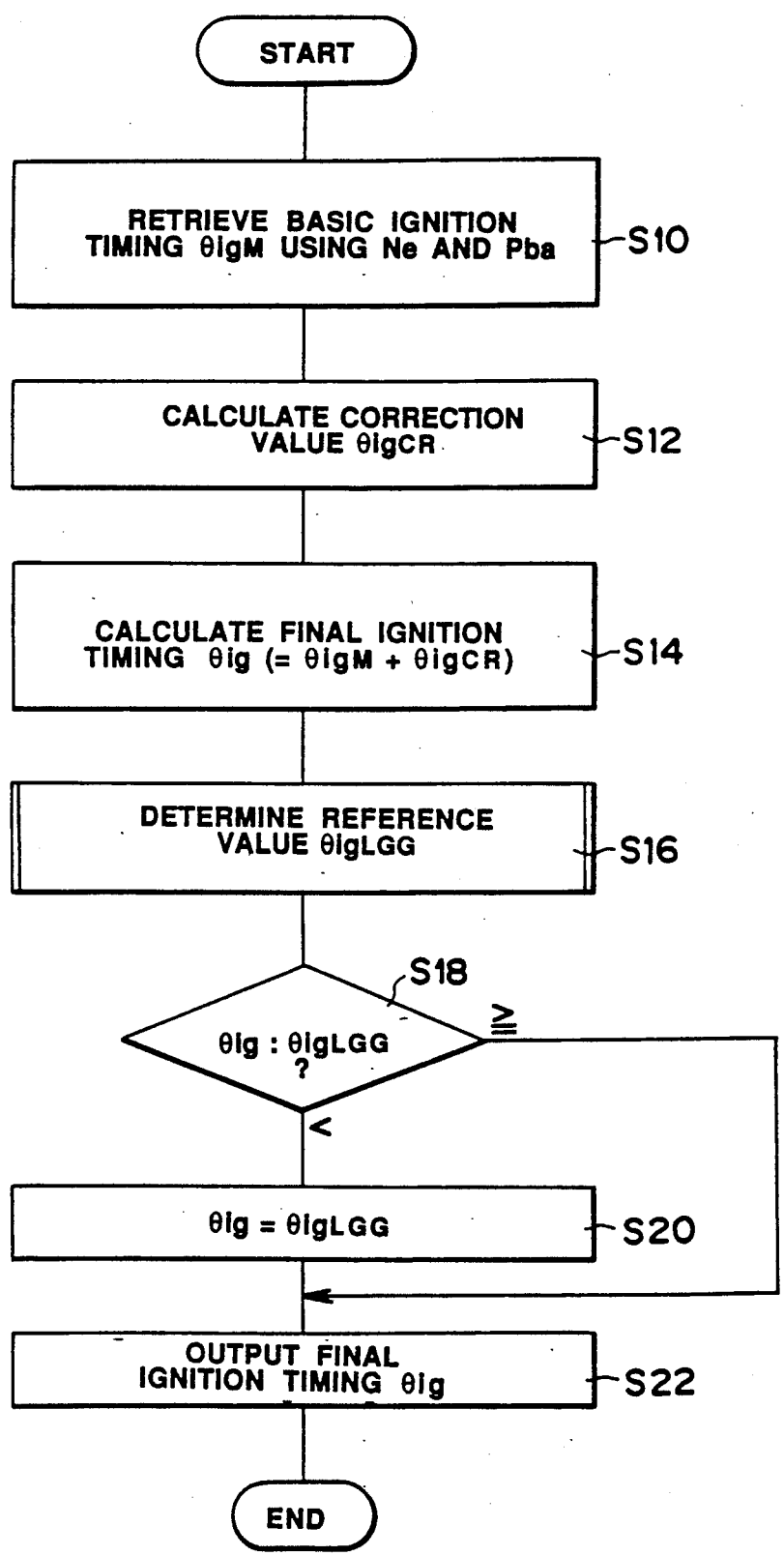
FIG. 3 is a flowchart showing the main routine of a program for operating the system according to this invention.

The operation of the system will now be explained with reference to the flowchart of FIG. 3. Execution of the program indicated in FIG. 3 is initiated in the microcomputer 64 once every prescribed crank angle.

Figure 4:
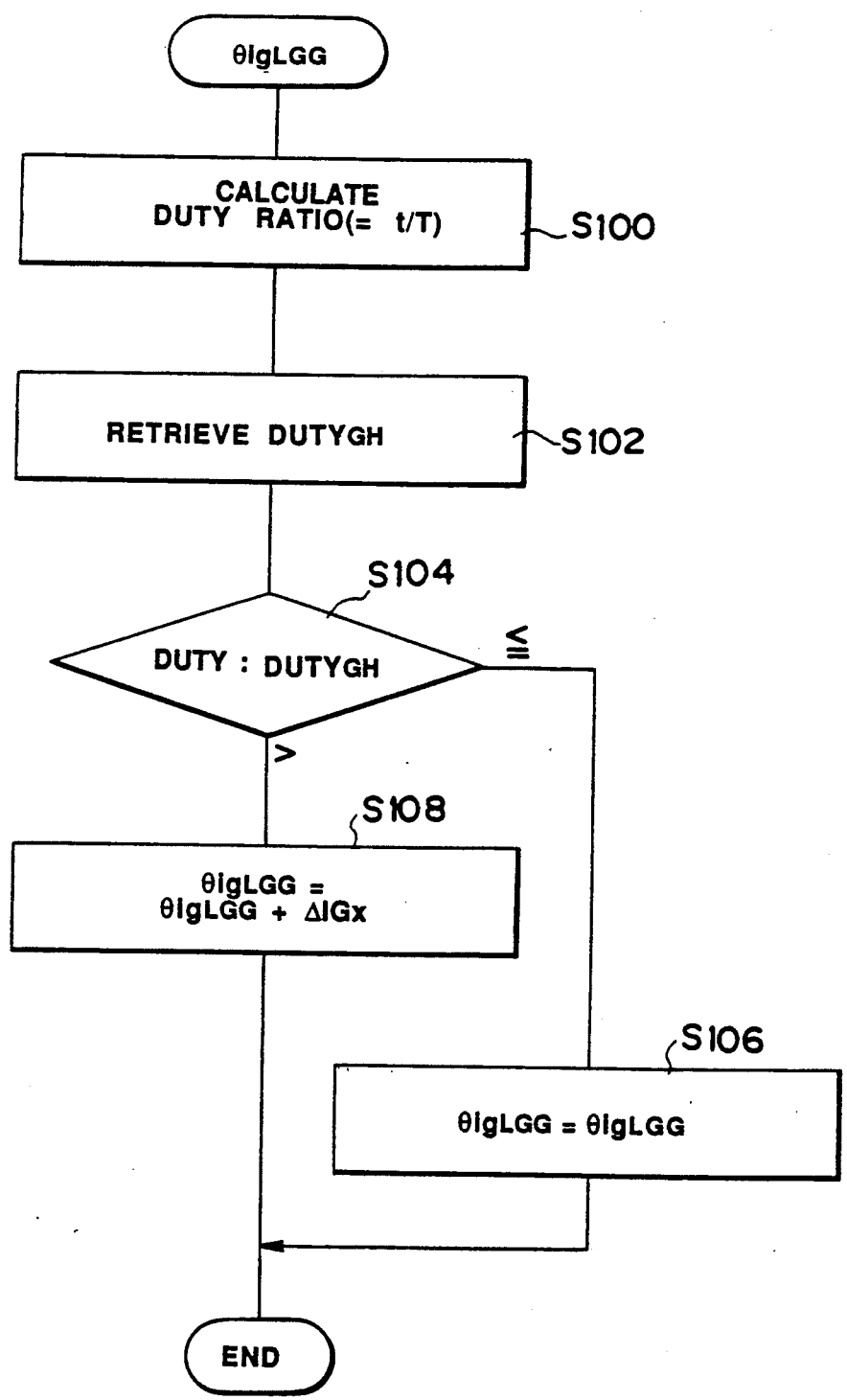
FIG. 4 shows a routine for determining or changing a retard limit used in the main routine of FIG. 3.
Figure 5:
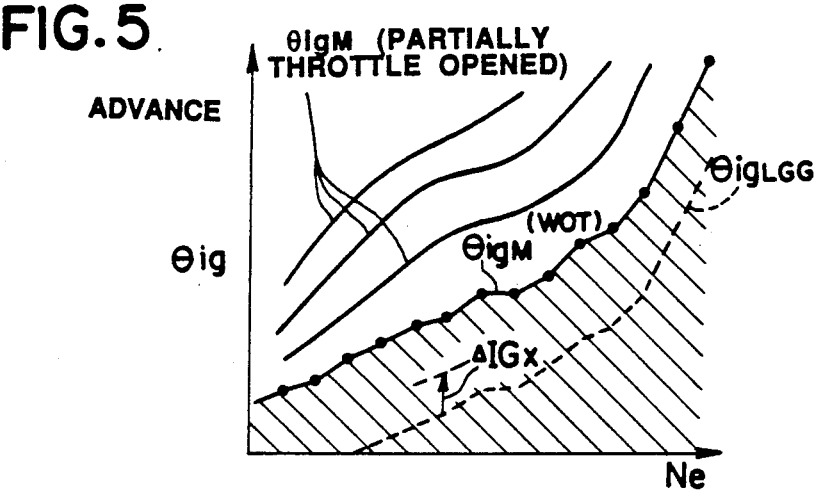
FIG. 5 is a graph for explaining the characteristics of the retard limit with respect to the engine speed.
Figure 7:
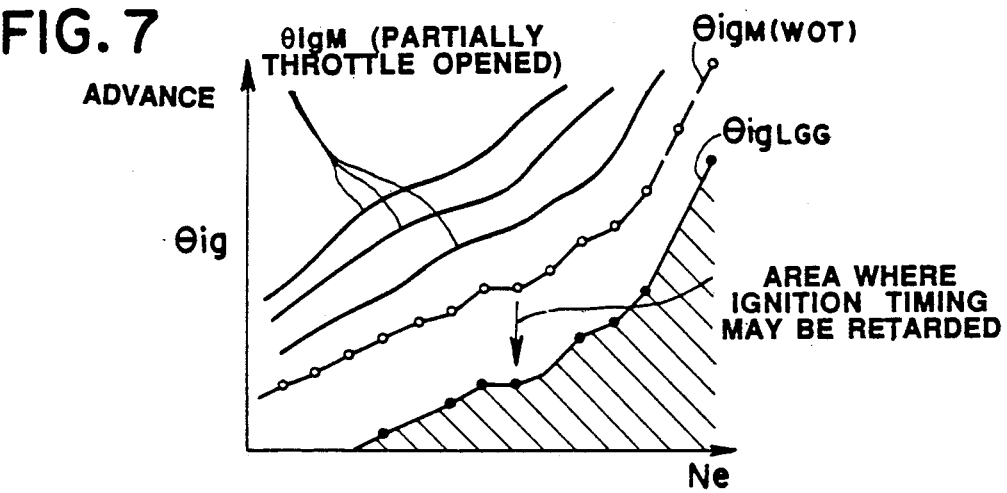
FIG. 7 is a graph similar to that of FIG. 5 for explaining the characteristics of a conventional fixed retard limit.

First, in step S10 a basic ignition timing $\theta_{igM}$ is determined on the basis of a map value retrieved from the ROM 64d of the microcomputer 64 using the engine speed and the intake air pressure (engine load) as address data. Next, in step S12 a water temperature correction value determined from the output of the coolant temperature sensor 30 etc., and a knock correction value output of the detonation detection circuit 68 are combined to obtain a correction value $\theta_{igCR}$. The correction value $\theta_{igCR}$ can be either positive (indicating a timing adjustment in the advance direction) or negative (indicating a timing adjustment in the retard direction). The procedure then moves to step S14 in which the basic ignition timing and the correction value are added together to obtain the final ignition timing $\theta_{ig}$. Then procedure advances to step S16 in which a reference value $\theta_{igLGG}$ (the aforesaid retard limit) is determined. The characteristics of this reference value are shown in FIG. 5 and are similar to those shown in FIG. 7 referred to earlier. They are basically arranged to be retrievable on the basis of the engine speed and are stored in the ROM 64d by an appropriate method in advance and is amended in a manner which will be explained with reference to FIG. 4 flowchart.

Figure 6:
FIG. 6 is a graph for explaining the characteristics of a unit change in the retard limit with respect to the engine speed or duty ratio.
Figure 8:
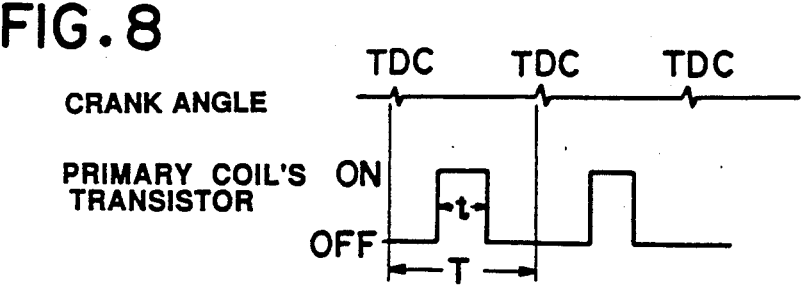
FIG. 8 is a timing chart showing the dwell angle during the TDC interval expressed in terms of ON duty ratio.
Figure 9:
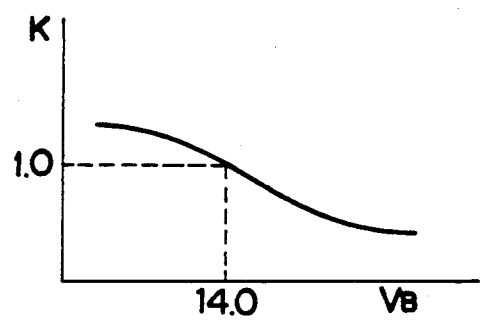
FIG. 9 is a graph for explaining battery voltage correction characteristics.
Figure 10:
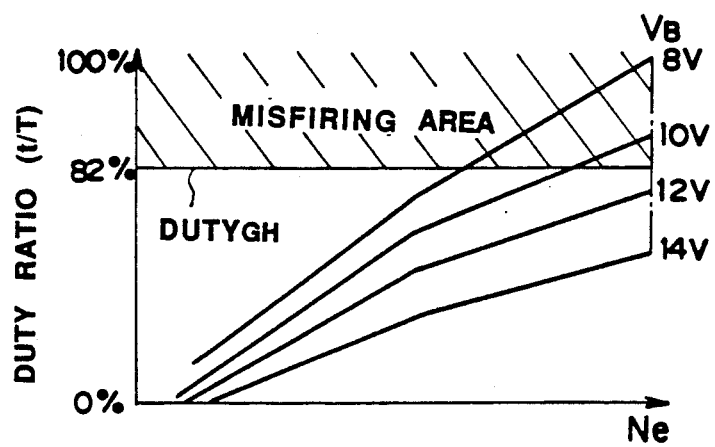
FIG. 10 is a graph for explaining the characteristics of the duty ratio and a reference duty ratio used in the flowchart of FIG. 4.
Figure 11:
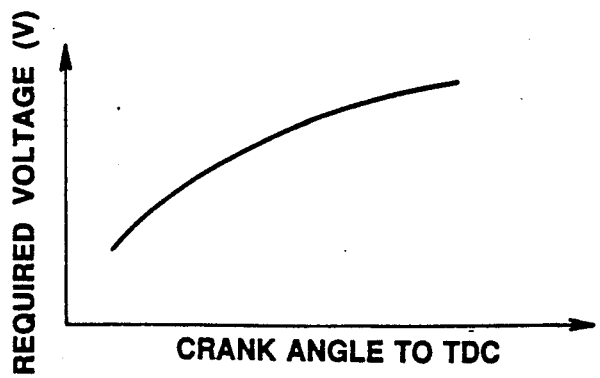
FIG. 11 a graph for explaining the characteristics of the required voltage with respect to the crank angle.

Namely, the duty ratio is firstly calculated in step S100. As was explained earlier with reference to FIG. 10, the characteristics of the duty ratio are stored in the ROM 64d so as to be retrievable using the engine speed $N_e$ and battery voltage $V_B$ as address data. This can be calculated either as an angular ratio or as a time ratio. Then in the following step S102, a reference(critical) duty ratio $DUTY_{GH}$ is retrievee. This is a fixed value, e.g. 82% as is shown in FIG. 10. More specifically, the value is a limit value and is made variable depending on the operating condition of the engine. The procedure then moves to step S104 where the calculated duty ratio and the reference duty ratio are compared. When it is found that the calculated value does not exceed the reference value, the procedure advances to step S106 wherein the aforesaid retard limit is maintained (is not changed), while when it is found that the calculated value exceeds the reference value, the procedure moves to step S108 in which a unit value Delta $IG_X$ is added to the retard limit, shifting the retard limit value in the advance direction by such amount. FIG. 6 illustrates the characteristics of the unit value Delta $IG_X$. As shown, this value is appropriately set as a function of the engine speed or the duty ratio. Since as the values increases, the possibility of misfiring increases.

Again returning to FIG. 3 flowchart, the procedure then advances to step S18 in which the calculated final ignition timing is compared with the retard limit and if it is found that final ignition timing exceeds the retard limit in the retard direction (i.e. it is less than the retard limit, the procedure advances to step S20 in which the final ignition timing is restricted to the retard limit and then to step S22 in which the limit value is determined as the final ignition timing and output. On the other hand if it is found that the final ignition timing has not reached the retard limit the calculated ignition timing is output in step S22 as it is. As a result, the ignition timing is held on the side of the limit where there is no possibility of misfirings occurring and the ignition timing can be retarded within the restriction of this limit without danger of misfirings.

Being arranged in the manner described above, this embodiment of the invention enables the ignition timing to be held within the region within which it is possible to secure adequate ignition energy and, as such, makes it possible, as necessary, to conduct appropriate retard control within this range while precluding the occurrence of combustion misses. It therefore makes it possible to eliminate any danger of misfirings when, for example, retard control is conducted during vehicle acceleration for the purpose of suppressing vehicle body vibration. Moreover, since the possibility of combustion misses can be reliably ascertained solely by detection of the duty ratio, this embodiment is also simple structurally.

While in the embodiment explained in the foregoing, the unit value Delta $IG_X$ by which the retard limit is changed is set as a function of the engine speed or the duty ratio, it can be made a fixed value.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling an ignition timing of an internal combustion engine, comprising:
   first means for detecting operating condition of the engine;
   second means for determining dwell angle of an ignition coil on the basis of the detected engine operating condition;
   third means for determining a retard limit on the basis of the detected engine operating condition such that ignition timing of the engine is determined within the retard limit;
   fourth means for calculating a ratio of the dwell angle to a prescribed angle and then for comparing the ratio with a reference value; and
   fifth means for changing the retard limit in the advance direction when the ratio is found to exceed the reference value.

2. A system according to claim 1, wherein said fifth means changes the retard limit by an amount which varies depending on engine speed.

3. A system according to claim 1, wherein said fifth means changes the retard limit by an amount which varies depending on the ratio.

4. A system according to claim 1, wherein said second means determines the dwell angle on the basis of engine speed and battery voltage.

5. A system according to any of claims 1, 2, 3 or 4, wherein said retard limit varies depending on engine speed.

* * * * *